US008090621B1

(12) United States Patent
Chakrabarti et al.

(10) Patent No.: US 8,090,621 B1
(45) Date of Patent: Jan. 3, 2012

(54) METHOD AND SYSTEM FOR ASSOCIATING FEEDBACK WITH RECOMMENDATION RULES

(75) Inventors: Kushal Chakrabarti, Kirkland, WA (US); Brent R. Smith, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 1209 days.

(21) Appl. No.: 11/769,586

(22) Filed: Jun. 27, 2007

(51) Int. Cl.
G06Q 30/00 (2006.01)
(52) U.S. Cl. ..................................... 705/26.1; 705/27.1
(58) Field of Classification Search ................ 705/26.1, 705/26.7, 14.49
See application file for complete search history.

(56) References Cited

U.S. PATENT DOCUMENTS

| | | | | |
|---|---|---|---|---|
| 4,996,642 | A * | 2/1991 | Hey .............................. | 705/7.29 |
| 5,974,412 | A * | 10/1999 | Hazlehurst et al. ................... | 1/1 |
| 6,912,505 | B2 * | 6/2005 | Linden et al. .............. | 705/14.53 |
| 6,963,850 | B1 * | 11/2005 | Bezos et al. ................. | 705/7.29 |
| 7,295,995 | B1 * | 11/2007 | York et al. .................... | 705/26.8 |
| 7,885,902 | B1 * | 2/2011 | Shoemaker et al. .......... | 705/319 |
| 2001/0021914 | A1 * | 9/2001 | Jacobi et al. ....................... | 705/8 |
| 2002/0019763 | A1 * | 2/2002 | Linden et al. .................. | 705/10 |
| 2002/0120609 | A1 * | 8/2002 | Lang et al. ......................... | 707/1 |
| 2002/0161664 | A1 * | 10/2002 | Shaya et al. .................... | 705/26 |
| 2002/0199194 | A1 * | 12/2002 | Ali ................................. | 725/46 |
| 2004/0083232 | A1 * | 4/2004 | Ronnewinkel et al. .... | 707/104.1 |
| 2005/0038717 | A1 * | 2/2005 | McQueen et al. .............. | 705/27 |
| 2005/0076093 | A1 * | 4/2005 | Michelitsch et al. ......... | 709/217 |
| 2008/0270398 | A1 * | 10/2008 | Landau et al. .................... | 707/6 |

OTHER PUBLICATIONS

Corboy, Martin "E-Commerce: Dispelling the Myths and Exploiting the Opportunities" Management Accounting, v77n11, p. 38-42, 1999.*
Young-Woo Seo and Byoung-Tak Zhang, "A Reinforcement Learning Agent for Personalized Information Filtering," Proceedings of the 5th International Conference on Intelligent User Interfaces, 2000, pp. 248-251 (ISBN:1-58113-134-8).
U.S. Appl. No. 10/286,430, filed Oct. 30, 2002; please treat as prior art for examination purposes.
U.S. Appl. No. 10/393,505, filed Mar. 19, 2003; please treat as prior art for examination purposes.

* cited by examiner

Primary Examiner — Yogesh C Garg
Assistant Examiner — Matthew Zimmerman
(74) Attorney, Agent, or Firm — Knobbe, Martens, Olson & Bear LLP (57) ABSTRACT

A recommendation system uses feedback from users on specific item recommendations to assess the quality of the recommendation rules used to generate such recommendations. The feedback may be explicit (e.g., a user rates a particular recommended item), implicit (e.g., a user purchases a recommended item), or both. The system may use these assessments to modify the degree to which particular recommendation rules are used to generate recommendations. For instance, if a particular recommendation rule leads to negative feedback relatively frequently, the system reduce or terminate its reliance on the rule. In some embodiments, the system may also increase its reliance on recommendation rules that tend to produce positive feedback.

37 Claims, 4 Drawing Sheets

FIG. 1

> Recommended for You

These recommendations are based on items you own and more.

View: All | New Releases | Coming Soon          [More results ▶]

---

1. The Artic Incident (Artemis Fowl, Book 2)
   (February 21, 2007)
   Average Customer Review: ★★★★☆
   Used & new from $3.29                    [🛒Add to cart] [Add to Wish List]
   ☐ I Own It   ☐ Not Interested   x|☆☆☆☆☆ Rate It
   Recommended because you said you owned The Eternity Code (Artemis Fowl, Book 3) and more (edit)

---

2. Building Robot Drive Trains (Robot DNA Series)
   by Dennis Clark (Author), Michael Owings (Author) (September 11, 2002)
   Average Customer Review: ★★★★☆
   In Stock
   Our Price: $16.47   Used & new from $12.99     [🛒Add to cart] [Add to Wish List]
   ☐ I Own It   ☐ Not Interested   x|☆☆☆☆☆ Rate It
   Recommended because you said you purchased Robot Builder's Bonanza, Third Edition and more (edit)

---

3. Eldest (Inheritance, Book 2)
   by Christopher Paolini (Author) (March 13, 2007)
   Average Customer Review: ★★★★☆
   In Stock
   Our Price: $9.74   Used & new from $6.95     [🛒Add to cart] [Add to Wish List]
   ☐ I Own It   ☐ Not Interested   x|☆☆☆☆☆ Rate It
   Recommended because you said you owned Artemis Fowl: Opal Deception (Artemis Fowl (Mass Market)) and more (edit)

---

4. Pirates of the Caribbean – Dead Man's Chest (Two-Disc Collector's Edition)
   DVD ~Orlando Bloom (December 5, 2006)
   Average Customer Review: ★★★★☆
   In Stock
   Our Price: $24.99   Used & new from $11.13    [🛒Add to cart] [Add to Wish List]
   ☐ I Own It   ☐ Not Interested   x|☆☆☆☆☆ Rate It
   Recommended because you added Harry Potter and the Deathly Hallows (Book 7) to your Shopping Cart and more (edit)

---

Did you make changes on this page? Refresh your recommendations.     [More results ▶]

METHOD AND SYSTEM FOR ASSOCIATING FEEDBACK WITH RECOMMENDATION RULES

TECHNICAL FIELD

The present disclosure relates to recommendation systems, including recommendation systems that use recommendation rules to select items to recommend to users.

BACKGROUND

Some web sites and other types of interactive systems implement recommendation services for generating personalized recommendations of items stored or represented in a data repository. One common application for recommendation services involves recommending products for purchase, rental, subscription, viewing or some other form of consumption. For example, some e-commerce web sites provide services for recommending products to users based on their respective purchase histories, rental histories, product viewing histories, or item ratings. Recommendation services are also used to recommend web sites, news articles, users, music and video files, and other types of items.

Some recommendation systems operate by using collected event histories of users to generate recommendation rules that associate particular items with other items. These rules are then used to generate personalized recommendations for users. As one example, if a relatively large number of users who purchase item A also purchase item B, a recommendation rule may be generated that associates item A with item B. This rule may then be used as a basis for recommending item B to users who purchase, view, favorably rate, or otherwise express an interest in item A. The recommendation system may also generate and use recommendation rules that are based on more complex associations (e.g., "users who search for X tend to view Y," or "users who purchase A and B tend to purchase C.").

SUMMARY OF THE DISCLOSURE

One problem with existing recommendation systems of the type described above is that they are susceptible to generating poor recommendations as the result of "low-quality" recommendation rules. Such low-quality recommendation rules may, for example, result from aberrational user activity over a period of time, or from limitations in the mining algorithms used to generate the recommendation rules.

To address this and other limitations, a system is provided for using feedback from users on specific recommendations to assess the quality of the recommendation rules used to generate such recommendations. The feedback may be explicit (e.g., a user rates a particular recommended item), implicit (e.g., a user purchases a recommended item), or both. The system may use these assessments to modify the degree to which particular recommendation rules are used to generate recommendations. For instance, if a particular recommendation rule leads to negative feedback relatively frequently, the system may reduce or terminate its reliance on the rule. In some embodiments, the system may also increase its reliance on recommendation rules that tend to produce positive feedback.

Neither this summary nor the following detailed description purports to define the invention. The invention is defined by the claims.

BRIEF DESCRIPTION OF THE DRAWINGS

Specific embodiments will now be described with reference to the drawings, which are intended to illustrate and not limit the various features of the invention.

FIG. 2 illustrates a web page that enables users to provide feedback on particular item recommendations.

DETAILED DESCRIPTION OF SPECIFIC EMBODIMENTS

I. Overview (FIGS. 1 and 2)

Figure 1:
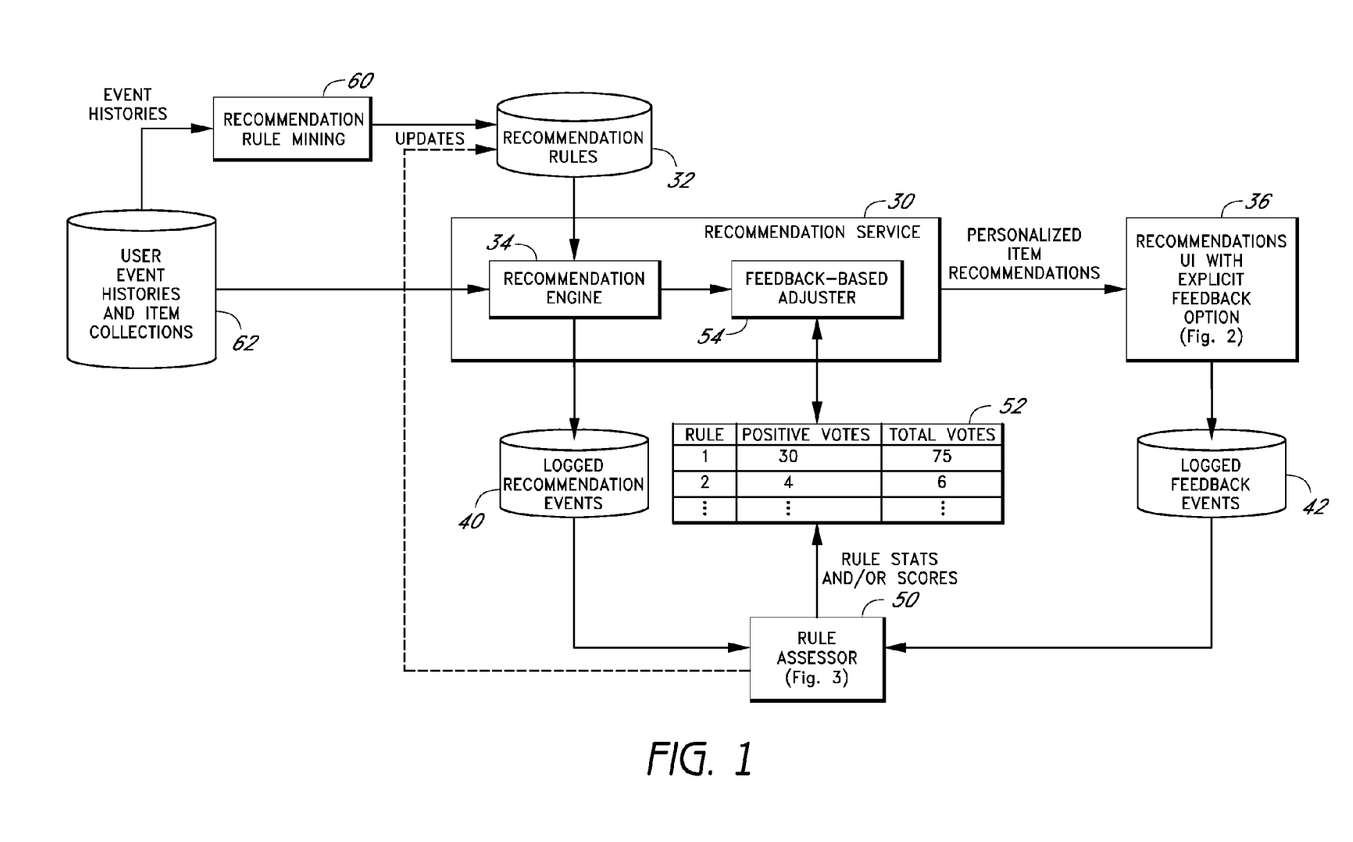
FIG. 1 illustrates a recommendation system according to one embodiment.

FIG. 1 illustrates a recommendation system according to certain embodiments. The recommendation system, may, for example, be part of an interactive system, such as a web site, that enables users to browse an electronic catalog or other repository of items. The items may, for example, be products available for purchase or rental, digital works (e.g., music and/or video files) available for download, news and magazine articles available for viewing, blog postings, television shows, podcasts, authors, and/or any other type of item that can be stored or represented in a database. For purposes of illustration, the recommendation system will be described primarily in the context of a web site that provides functionality for users to browse and make purchases from an electronic catalog; however, as will be recognized, the disclosed recommendation system and methods may also be used in numerous other environments.

As illustrated in FIG. 1, the recommendation system includes a recommendation service 30 that generates personalized item recommendations for users using a database of recommendation rules 32. The recommendations are generated using a recommendation engine 34. The recommendation engine may, but need not, operate as described in U.S. Pat. No. 6,853,982, the disclosure of which is hereby incorporated by reference. In a large scale system, many millions of recommendation rules may be used.

To generate personalized recommendations, the recommendation engine 34 applies the recommendation rules to an appropriate event history of the target user, and/or to user data derived from the user's event history. For example, the recommendations may be generated based on the target user's purchase history, explicit item ratings, rental history, wish list, rental queue, search history, browse history, geographic location, and/or any other type of data reflective of the target user's interests. In one embodiment, the item recommendations are presented to the target user via a recommendation user interface 36 that provides an option to rate each recommended item. One example of such a user interface is shown in FIG. 2 and is discussed below.

Each time the recommendation service 30 recommends an item to a user, the system logs the recommendation event in a data repository 40. The logged recommendation event data may specify the recommended item, the recommendation rule or rules used to generate the recommendation, the target user, and the time/date of the recommendation. In addition, each time a user rates an item via the recommendations user interface 36, the system logs the rating event in a data repository of feedback data 42. The logged event data may specify the item and user involved, the user's rating of the item, and the date/time of the feedback event. These rating events are referred to herein as explicit feedback events, as they reflect an explicit intent by the user to provide feedback.

In some cases, a feedback event may be logged even if the user does not rate a recommended item via the recommendations user interface 36. These feedback events are referred to herein as implicit feedback events. For example, if a user purchases a recommended item within a defined time period after the item is recommended, the system may treat the purchase event as an implicit positive feedback event. Other types of post-recommendation user actions that may be treated as positive implicit feedback events include, but are not limited to, the following: adding a recommended item to a shopping cart, wish list or rental queue; clicking through from the recommendations page to an item's detail page; submitting a textual review of a recommended item. In one embodiment, the only type of implicit feedback event recognized by the system is a positive feedback event. As will be recognized, the disclosed system and methods can be implemented using explicit feedback only, implicit feedback only, or both explicit and implicit feedback.

With further reference to FIG. 1, a rule assessor 50 associates the recorded feedback events with the respective recommendation events to which they correspond. This enables the system to treat a particular feedback event as a vote on the quality of the recommendation rule or rules used to generate the recommendation. As discussed below, the aggregated feedback or vote data collected over time for a given recommendation rule may be used to refine the system's reliance on that rule, so that the quality of the system's recommendations adaptively improve over time.

Although the recommendation events and feedback events are shown in FIG. 1 as being logged separately from each other, this need not be the case. For example, the system may alternatively log each feedback event together with an indication of the recommendation rule or rules used to generate the corresponding recommendation.

Regardless of how the recommendation and feedback events are recorded, appropriate logic may optionally be used to assess whether a given feedback event is likely the result of, and should thus be associated with, a particular recommendation rule. For instance, when a user provides feedback on a recommendation that is based on multiple rules, the system may, in some embodiments, refrain from associating the feedback event with one or more of these rules. To reduce ambiguity in this situation, the system may alternatively display each "reason" for the recommendation (where each reason corresponds to a particular recommendation rule, as discussed below with reference to FIG. 2), and may ask the user to indicate whether each such reason is good. The feedback event may then be associated only with those recommendation rules corresponding to reasons designated as "good."

FIG. 2 illustrates one example of a web page of a recommendations user interface 36 that may be used to display and collect feedback on item recommendations. Four item recommendations are shown, although a greater number of recommendations (e.g., 15) may be displayed on each recommendations page. The first three items are displayed with a particular reason for the recommendation, and the fourth is displayed with two reasons. Each reason corresponds to a particular recommendation rule. The reasons for the recommendations may alternatively be omitted (not presented to the user).

In this particular example of FIG. 2, the user can provide explicit feedback on each recommendation by checking a "not interested" check box or an "I own it" check box, or by clicking on star to rate the item on a scale of one to five stars. In one embodiment, a rating of one star, two stars or "not interested" is treated as a negative vote on the corresponding recommendation rule(s), and a rating of "I own it," four stars, or five stars is treated as a positive vote. Ratings of three stars may be ignored, or may be treated as positive votes.

While viewing the recommendations page of FIG. 2, the user can click on an item's title to view the item's detail page, and can select buttons for adding the item to a personal shopping cart or wish list. As mentioned above, some or all of these types of selection actions may be treated as (implicit) positive feedback events or votes. User actions performed after viewing the recommendations page may also be treated as implicit positive feedback, such as when a user subsequently purchases a recommended item.

The particular item rating options shown in FIG. 2 are merely illustrative, and numerous alternatives are possible. As one example, the user may alternatively be asked whether the recommendation is useful, and given the option to respond "yes" or "no." The "yes" responses may be treated as positive votes on the corresponding recommendation rules, and the "no" responses as negative votes. As another example, a "not interested" checkbox can be provided without any other explicit rating or feedback options; with this approach, selection of "not interested" may be treated as a negative vote, and a favorable action performed on the recommended item (e.g., purchasing the item) may be treated as a positive vote.

The feedback provided by the user may also be used to update the user's profile with information useful for generating recommendations for this user. For example, if the user rates an item favorably or indicates ownership of the item, the system may add the item to a personal "item collection" used to generate recommendations for this user. The use of item collections and recommendation rules to generate personalized recommendations is described below in the section titled "Generation and Use of Recommendation rules."

The system may use the user feedback to refine the recommendation service's reliance on particular recommendation rules in any of a number of ways. One particular example is depicted in FIG. 1 by the vote statistics table 52 and the block labeled "feedback-based adjuster" 54. With this approach, the rule assessor 50 maintains statistics regarding the feedback on particular recommendation rules, and these statistics are used to refine the output of the recommendation engine 34.

As one example, the total number of votes and the total number of positive votes may be determined for each recommendation rule for a particular window of time, such as the last day, week or month. If the ratio of positive votes to total votes for a particular recommendation rule falls below some threshold, such as 0.4, the adjuster 54 may filter out, or decrease the display rank of, any recommendations that are based on (or based solely on) that rule. (The display rank is the position or rank of the item in an overall recommendation set returned by the recommendation engine 34, and may dictate whether the recommendation is seen by the user and/or how far the user must browse or scroll through the recommendation set before seeing the item.) On the other hand, if the ratio is unusually high (e.g., greater than 0.8), the adjuster 54 may increase the display rank of the item. The actual threshold or thresholds used may be based on probability distributions of the vote ratios for all rules.

The adjuster 54 may apply a significance test to a rule's vote data before relying on the vote ratio to refine recommendations. For example, the adjuster may disregard a recommendation rule's vote ratio unless the total number of votes for the rule exceeds some minimum, such as ten or twenty.

Table 1 illustrates an example dataset of recommendation and feedback events. In this basic example, each recommendation rule is an item-to-item mapping, and each recommendation is based on a single recommendation rule. The characters A, B, X and Y represent respective items.

TABLE 1

| User | Recommendation rule (reason for recommendation) | Feedback |
|---|---|---|
| 1 | X → A | Positive |
| 1 | X → B | (none) |
| 2 | Y → A | Negative |
| 3 | Y → A | (none) |
| 4 | X → A | Negative |
| 5 | X → A | Negative |

Applying the vote-tallying approach described above produces the vote totals shown in Table 2. No entry appears in Table 2 for X→B because this recommendation rule did not receive any feedback.

TABLE 2

| Recommendation Rule | Positive Votes | Negative Votes |
|---|---|---|
| X → A | 1 | 2 |
| Y → A | 0 | 1 |

In this example, it is assumed that a total vote count of three is required before the system relies on the vote/feedback data for a given rule. Because the total vote count for Y→A does not meet this threshold, the system does not use the rule's vote data to adjust the system's reliance on the rule.

For X→A, the total vote count meets the minimum threshold of three. Because the ratio of positive votes to total votes for this rule is relatively low (0.333), the recommendation system may automatically decrease its reliance on this rule to generate recommendations. For example, the system may filter out, or lower the display rank of, recommendations that are based on this rule.

The feedback-based adjuster 54 may filter out recommendations, or lower the display ranks, using a probabilistic or other algorithm that ensures that particular recommendation rules will not be permanently "blacklisted." For example, suppose a particular recommendation rule has a low positive-to-total vote ratio, such as 2/10. If the system merely filters out all recommendations that are based on this rule (or otherwise discontinues use of the rule to recommend items), no additional feedback will be collected for the rule; thus, the recommendation rule will remain blacklisted, even if the low vote ratio is the result of aberrational user activity. To avoid this scenario, the adjuster may only filter out the recommendations some percentage of the time (e.g., 90%), such that the rule's vote ratio has an opportunity to recover. A similar approach may be used for lowering the display ranks of recommended items.

The adjuster 54 may also occasionally increase the display ranks of items in the recommendation set using an algorithm that seeks to collect a statistically significant sample of feedback data for each recommendation rule. For example, in the example of Tables 1 and 2, the system may temporarily boost the display rank of recommendations based on Y→A to increase the likelihood of obtaining a statistically significant quantity of vote data for this rule.

Numerous variations to the particular implementation shown in FIG. 1 are possible. For instance, rather than counting all votes equally, more weight can be given to votes from certain types users, such as frequent users or "top 100 reviewers." More weight can also be given, for example, to a five-star rating than to a four-star rating. As another example, when a given recommendation is based on multiple recommendation rules, the feedback vote may be apportioned between these rules; for instance, if negative feedback is given on a recommendation that is based on two recommendation rules, one half of a negative vote may be counted for each recommendation rule. As yet another example, the rule assessor 50 may periodically generate a score for each recommendation rule, and these scores may be used in place of the vote counts to determine whether/how to adjust the recommendations.

Another variation is to move the task of taking the aggregated feedback into consideration to the recommendation engine 34 itself. For instance, if a given recommendation rule has a significantly lower than average positive-to-total vote count ratio or score, the recommendation engine 34 may give proportionally less weight to that recommendation rule when generating personalized recommendations. This tends to reduce the frequency with which the rule is used to generate recommendations that are seen by users. With this approach, the adjuster 54 shown in FIG. 1 may be eliminated. As depicted by the dashed line in FIG. 1, this approach may be implemented by periodically updating the rules database 32, or some other data repository accessed by the recommendation engine 34, with rule-specific vote statistics and/or scores.

II. Generation and Use of Recommendation Rules

The recommendation system may use any of a variety of different types of recommendation rules to generate the personalized recommendations. Typically, each recommendation rule partially or fully specifies a condition to be checked, and specifies an item (or possibly a group of items) to be recommended or nominated for recommendation to users who satisfy the condition. The condition may, for example, be that a particular item, set of items, event, or set of events must be present in an event history or item collection of the target user. A recommendation rule may also include an optional weight value that specifies a strength of the association between the condition and the item.

As one example, the recommendation rules can include or consist of rules of the following form: item A→item B (0.8). This rule represents an association between items A and B with a strength or weight of 0.8 on a scale of zero to one. (Rules of this type are sometimes referred to as "item-to-item mappings," "item similarities," or "item-to-item similarity mappings.") This rule may, for example, be used to select or nominate item B to recommend to a user who has purchased, indicated ownership of, or otherwise indicated an affinity for, item B. Methods for generating and using this type of recommendation rule are described in U.S. Pat. Nos. 6,266,649 and 6,853,982.

As depicted in FIG. 1, the recommendation rules may be generated automatically by a recommendation rule mining component 60 that periodically analyzes aggregated event history data 62 of a large population of users (typically millions of users). These event histories may, for example, include purchase histories, item viewing histories, rental histories, item download histories, search histories, item tagging activities, or some combination thereof. For instance, if purchase histories are used, the rule item A→item B (0.8) may be generated based on an observation that a relatively large number of users who purchase item A also purchase item B. If item viewing histories are used, the rule may be generated based on an observation that a relatively large number of users who select item A for viewing also select item B for viewing during the same browsing session. Although a single mining component 60 is shown, different software modules and algorithms may be used to detect different types of associations and generate different types of rules.

The particular type of user behavior used to generate a recommendation rule may govern how that rule is used to generate recommendations. For example, a rule that specifies a purchase-based association between two items may be used to generate recommendations that are based on items the target user has purchased or owns. On the other hand, a rule that specifies an item-viewing based association between two items may be used to generate session-specific recommendations that are based on the items viewed by the user during the current browsing session. U.S. Pat. No. 6,853,982, referenced above, includes examples of algorithms that may be used to generate and use purchase-based and item-viewing-based recommendation rules in the form of item-to-item mappings.

The following are examples of other types of recommendation rules that may be mined from collected behavioral data and used to generate recommendations.

{A and B}→C. This type of rule associates a pair of items with a target item. If the rule is derived from user purchase histories (meaning that users who purchase both A and B also tend to purchase C), it may be used to nominate C for recommendation to a user who has purchased both A and B. Recommendation rules of this type may be generated using various known methods, including but not limited to those described in U.S. Pat. Pub. 2006/0106665.

Time-ordered purchases with delay. This type of rule specifies that users who purchase a first item tend to purchase a second item after a designated amount of time. For example, the rule mining component 60 may detect that a relatively large number of users who purchase a particular printer also purchase a particular replacement ink cartridge three to five months later. Based on this observation, a recommendation rule may be generated that causes the ink cartridge to be recommended (or nominated for recommendation) to any user who both (a) has purchased the printer three to five months ago and (b) has not yet purchased the ink cartridge. This type of rule is also useful for recommending books and videos that are sequels. Examples of data mining methods that may be used to generate this type of recommendation rule are described in application Ser. No. 10/945,547, filed Sep. 20, 2004, the disclosure of which is hereby incorporated by reference.

Search-based rules. This type of recommendation rule associates a particular search query with a particular item. Such a rule may be generated based on an observed tendency of users who submit the search query to select the item for viewing, purchase, rental, or some other purpose. This type of rule may be used to generate personalized recommendations that are based on the target user's search history. Examples of data mining methods that may be used to generate associations between particular search queries and particular items are described in U.S. application Ser. No. 10/966,827, filed Oct. 15, 2004, the disclosure of which is hereby incorporated by reference.

Source event type, item A→target event type, item B. This type of rule associates two items based on two different types of item-related events. As one example, the rule "view item A→purchase item B" may be generated to reflect that a large percentage of those who view item A thereafter purchase item B. Examples of event types that may be used as source and target events include, but are not limited to, the following: purchase, view, rent, review, rate, rate favorably, add to cart, add to wish list, add to rental queue, save to library, tag, forward, print. This type of rule may be used to recommend item B for purposes of event type B to a user who has performed event type A on item A. Examples of data mining methods that may be used to generate this type of recommendation rule are described in U.S. application Ser. No. 10/864,288, filed Jun. 9, 2004, the disclosure of which is hereby incorporated by reference.

Email domain based rule. This type of recommendation rule associates a particular email address domain with a particular item or set of items. These rules may be generated by analyzing user purchase histories, or another type of item-related event history, to identify items that are unusually or uniquely popular among users having particular domain names in their email addresses. For example, if a particular book is significantly more popular among users with "microsoft.com" in their email addresses than in a more general user population, a recommendation rule may be created that links the "microsoft.com" domain to this particular book. (In this example, the association reveals that the book is likely unusually popular among Microsoft employees.) The rule may then be used to recommend the book to users who have this domain name in their email addresses. Examples of statistical methods that may be used to create these types of rules are described in U.S. Pat. No. 6,963,850, the disclosure of which is hereby incorporated by reference.

Geography-based rules. This type of recommendation rule is similar to an email domain based recommendation rule, but associates a particular zip code, city, or other geographic identifier with a particular item. This type of rule may be generated by analyzing user event histories (e.g., purchase histories) in conjunction with users' shipping addresses to identify items that are unusually popular in specific geographic regions. Such a rule may be used to select items to recommend to users having mailing addresses falling in these geographic regions. Examples of statistical methods that may be used to create these types of rules are described in U.S. Pat. No. 6,963,850, referenced above.

Recommendation rules may also be generated based partly or wholly on content-based associations between items. For example, a content analysis component may compare the text, attributes, and/or other types of content of particular items, and create rules that associate items having similar or related content. In addition, recommendation rules can be generated that are based on a combination of content-based and behavior-based associations, as described in U.S. application Ser. No. 11/424,730, filed Jun. 16, 2006, the disclosure of which is hereby incorporated by reference.

The foregoing are merely examples. Numerous other types of recommendation rules can be used, and can be assessed using the feedback methods described above.

As depicted in FIG. 1, the recommendation engine 34 may, in some embodiments, generate recommendations based on the event history of the target user, or based on some collection of items identified from the user's event history. For example, if the recommendation rules are of the form item A→item B (w) and are derived from user purchase histories, the recommendation engine 34 may generate the recommendations based on the following collection of items, or a selected subset of these items: (a) items the target user has purchased, (b) items for which the user has indicated ownership, (c) items the user has rated, or has rated favorably. The recommendations may be generated and displayed in real time based on some action of the target user, such as selection of a "view your recommendations" link.

As mentioned above, multiple recommendation rules may be used in combination to generate a particular recommendation of an item. For instance, suppose the following purchase-based recommendation rules exist:

item 1234→item 5678 (0.3)
item 2345→item 5678 (0.6)

If the target user has purchased both item 1234 and item 2345, both of these rules may be invoked in combination to nominate or select item 5678 for recommendation. In this situation, the weights associated with these two rules may be appropriately combined (e.g., added) to generate a recommendation score for the recommendation of item 5678. (The weights themselves may be used as the recommendation scores where only one rule is invoked.) The recommendation scores may be used to rank all of the nominated items relative to one another for purposes of display, and/or to filter out (inhibit recommendations of) items having low recommendation scores.

Where recommendation scores are generated as described above, the adjuster 54 may adjust these scores based on the user feedback data (e.g., positive-to-total vote ratio) for the corresponding recommendation rules. Alternatively, the weight values of particular recommendation rules may be adjusted upward or downward based on the received feedback on those rules, so that the recommendation scores will reflect the user feedback.

III. Assessment of Recommendation Rules (FIG. 3)

Figure 3:
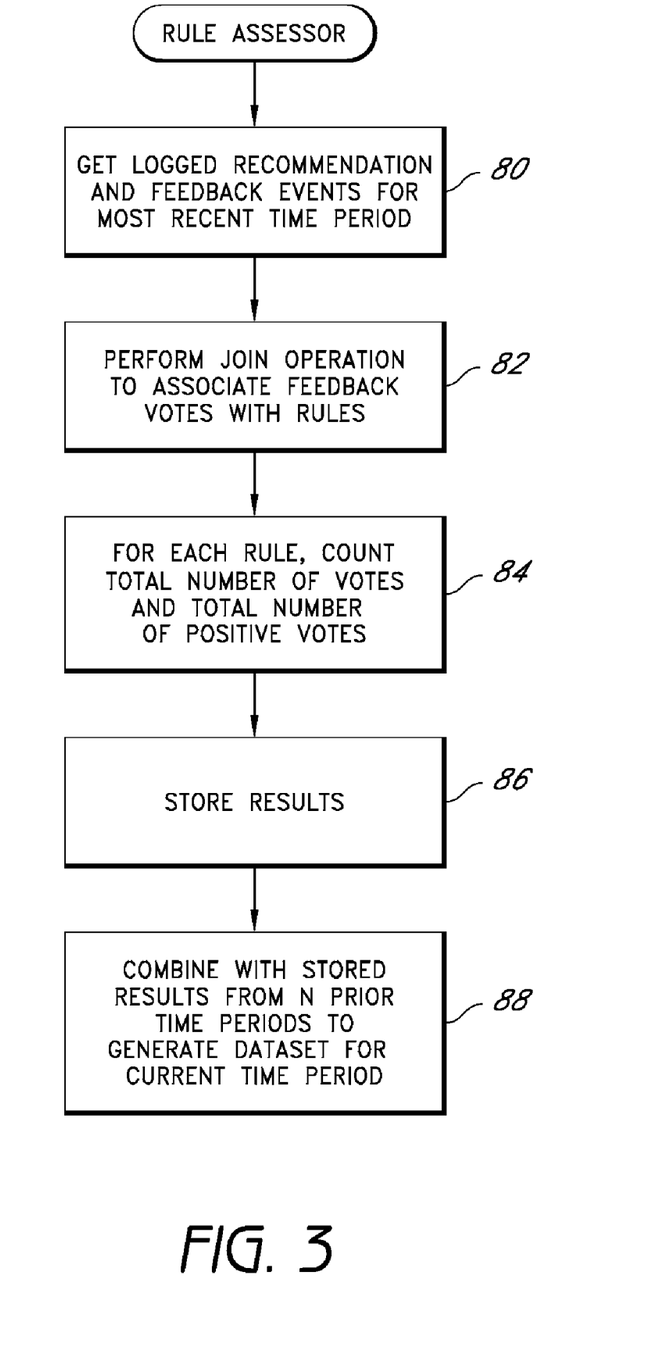
FIG. 3 illustrates a process that may be implemented by the rule assessor of FIG. 1 to evaluate the quality or performance of specific rules.

FIG. 3 illustrates one example of a process that may be used by the rule assessor 50 to compile statistical data or scores for particular recommendation rules. This process may be executed periodically (e.g., hourly, daily or weekly) to analyze the recommendation feedback data collected since the most recent iteration. The statistical data may additionally or alternatively be updated in real time as feedback events occur.

In step 80, the logged recommendation and feedback events for the most recent time period are retrieved. The length of the time period, and thus the frequency with which new feedback data is analyzed, may depend on the nature of the items involved. For instance, for products such as books and DVDs, the collected feedback data may be analyzed on a relatively infrequent basis, such as daily or weekly. For items such as news articles that are popular for much shorter periods of time, the feedback data may be analyzed more frequently, such as hourly or in real time. The recommendation rules may, but need not, be re-assessed more frequently than they are regenerated by the rule mining component 60.

In step 82 of FIG. 3, a join operation is performed to identify those recommendation events that resulted in feedback. This step enables each feedback event to be associated with a particular recommendation rule or set of recommendation rules. As explained above, the identities of the invoked recommendation rules may alternatively be captured when the feedback events are recorded.

In step 84, the process cycles through each joined recommendation/feedback event pair and counts the total number of votes, and the total number of positive votes, for each recommendation rule. As explained above, if the recommendation interface of FIG. 2 is used, all rating events (including "not interested" ratings) may be treated as votes, and ratings of three to five stars may be treated as positive votes. As will be apparent, numerous other options are available for compiling the recorded feedback events into meaningful statistical information or scores.

As further explained above, a given feedback event need not be counted as a single vote for each of the recommendation rules involved. For example, the vote may be apportioned among the invoked recommendation rules. As another example, the vote amount may be varied based on the type of the feedback event and/or based on information known about the user. As mentioned above, another option is to disregard feedback on recommendations that resulted from multiple recommendation rules; with this approach, a feedback event is counted only if it can be uniquely tied to a single recommendation rule.

In step 86, the results (vote counts for the current time period) for each recommendation rule are persistently stored. In addition, these results are combined with the results from the last N time periods to generate cumulative vote counts that are used to adjust the recommendation process. For instance, if the time period is one day, the vote totals for the most recent day's worth of feedback data may be combined with the results from the immediately preceding nineteen days to generate cumulative vote statistics for a 20-day "moving window." In combining the results for multiple consecutive time periods, more weight may optionally be given to more recent results. For instance, a linear or non-linear time-based decay function may be used to weight the constituent sets of results. Rather than disregarding old data, an exponential time-based decay function may be applied to collected data from all time periods, with this approach, all of the collected feedback data is considered, but progressively older feedback data is given progressively less weight.

The cumulative vote totals are represented in FIG. 1 by the vote statistics table 52. If time periods of one day are used, this table 52 may be re-generated on a daily based.

IV. Example System Architecture (FIGS. 1 and 4)

The various components shown in FIG. 1 can be implemented using software modules executed by one or more general purpose computers (physical machines) or servers. The recommendation rule mining component 60 and the rule assessor 50 may be implemented as respective programs that are executed periodically in an off-line processing mode. The recommendation service 30 may be implemented using service code that generates recommendations in real time in response to requests from other entities. The recommendation user interface 36 may be implemented in a combination of executable code and web page templates. The executable code of the foregoing components 30, 36, 50 and 60 may be stored on any type of computer storage device or medium.

The data repositories 32, 40, 42 and 62 shown in FIG. 1 may be implemented using any type or types of computer storage, and may be implemented using databases, flat files, or any other type of computer storage architecture. The statistics table 52 may be cached in the volatile RAM of one or more machines of the recommendation service 30 to provide a high degree of real time performance, or may be stored on a separate machine or service.

Figure 4:
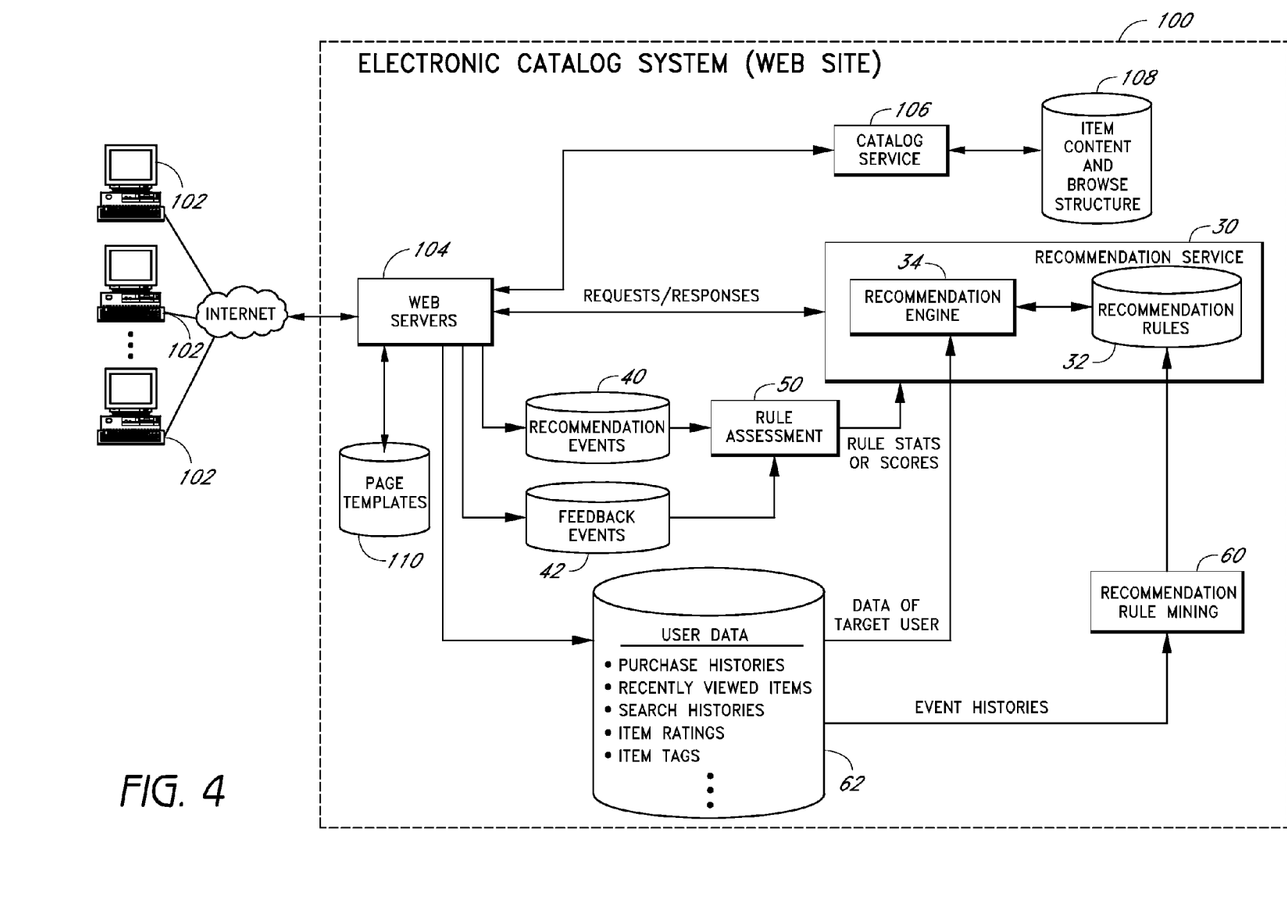
FIG. 4 illustrates one example of how the system of FIG. 1 may be implemented in the context of a web-based electronic catalog system.

FIG. 4 illustrates one particular example of how the system of FIG. 1 may be incorporated into a web-based electronic catalog system 100 that provides functionality for users to browse and make purchases from an electronic catalog of items. The system shown in FIG. 4 includes one or more web server machines 104 (collectively "web server") that generate and serve pages of a host web site in response to page requests from user computing devices 102. The web server 104 dynamically generates the requested pages using a repository of templates 110. The templates directly or indirectly specify the service calls that are made to various services to, e.g., request data needed to generate the requested page.

The web server 104 provides user access to a catalog of items represented in a database 108 or collection of databases. The items may include or consist of items that may be purchased via the web site (e.g., book, music, and video titles in physical or downloadable form; consumer electronics products; household appliances; apparel items, magazine and other subscriptions, etc.). The database 108 may also store data regarding how the items are arranged within a hierarchical browse structure. Data regarding the catalog items and the browse structure is accessible via a catalog service 106, which may be implemented as a web service.

As users browse and make purchases from the electronic catalog, the system records various types of user-generated events, such as detail page views, shopping card adds, wish list adds, item rating events, tagging events, purchases, and/or search query submissions. As illustrated in FIG. 4, the event histories, and data derived from such event histories, are stored in a data repository 62 (e.g., one or more databases or data services). For example, the data repository 62 may store users' purchase histories, item viewing histories, search histories, item ratings, item tags, wish lists, etc. The purchase histories and item viewing histories may be stored as lists of item identifiers together with associated event timestamps. The various types of user data may be accessible to other components of the system via a data service (not shown), which may be implemented as a web service.

With further reference to FIG. 4, the recommendation service 30 responds to requests from the web server 104 by generating and returning ranked lists of recommended items together. Although the recommendation service 30 may identify many hundreds or thousands recommended items in response to a single request, the ranked list it returns in one embodiment contains only a selected subset of these items (i.e., the top 15 items, or the next 15 items when the user selects "more results"). The web server uses these lists, together with item descriptions obtained from the catalog service 106, to build recommendation pages of the type shown in FIG. 2. In some embodiments, the recommendation service may also return one or more reasons for each recommendation, and the web server 104 may incorporate these reasons into the web page (as in FIG. 2).

Each time a recommendation page is generated and returned, the system logs a set of recommendation events identifying the recommended items listed on the page and the recommendation rule(s) that led to each such recommendation. This task may be performed by the recommendation service 30, or, as depicted in FIG. 4, by the web servers 104. In addition, each time a user provides feedback on a recommendation, the web server 104 logs a feedback event. The recommendation events and feedback events may be recorded in a log file, in a relational database, or in any other type of data repository.

In embodiments that take implicit feedback into consideration, the system may detect some types of implicit feedback events by analyzing user clickstreams or event histories. For example, the event history of a particular user session may be analyzed to determine whether the user purchased a recommended item at some point after viewing a recommendation of that item. This may be accomplished using well known log analysis techniques.

As illustrated in FIG. 4, the recorded recommendation events and feedback events are analyzed by a rule assessment component 50. In some embodiments, the rule assessment component 50 may also take other types of data into consideration in assessing a recommendation rule, such as how frequently the rule is invoked, how frequently it is invoked in combination with another rule to make a recommendation, how long the rule has been in existence, etc.

The rule assessment component 50 passes rule assessment data (e.g., statistics and/or scores) to the recommendation service 30. The recommendation service 30 uses the rule assessment data to refine its reliance on particular recommendation rules using one or more of the methods described above. In one embodiment, the recommendation service 30 only uses the rule assessment data to filter out, or to lower the display positions of, particular recommendations. In another embodiment, the recommendation service 30 also uses the data to boost the rankings of items, and/or to cause items that would otherwise be filtered out (due to their low recommendation scores) to be presented to the user.

V. CONCLUSION

Each of the processes and algorithms described in the preceding sections may be embodied in, and fully automated by, code modules executed by one or more computers or computer processors. The code modules may be stored on any type of computer-readable medium or computer storage device. The processes and algorithms may also be implemented partially or wholly in application-specific circuitry. The results of the disclosed processes and process steps may be stored, persistently or otherwise, in any type of computer storage.

The foregoing description is intended to illustrate specific embodiments of the invention, and not to define or limit the invention. Thus, nothing in the foregoing description should be construed to imply that any particular feature or component is essential to the invention. The invention is defined by the claims, which are intended to be construed without reference to any definitions that may be explicitly or implicitly included in any incorporated-by-reference materials.

What is claimed is:

1. A recommendation system, comprising:
a computing system comprising one or more computer processors, said computing system programmed with executable code modules to implement at least:
a recommendation rule mining component configured to generate recommendation rules based at least in part on aggregated event history data of a plurality of users, said recommendation rules reflecting behavior-based associations detected from the aggregated event history data, and identifying particular items to recommend to users;
a recommendation service configured to use the recommendation rules generated by the recommendation rule mining component, in combination with user-specific data, to generate personalized item recommendations for particular users;
a recommendation interface configured to enable the users to view the personalized item recommendations generated by the recommendation service and to provide explicit feedback on particular item recommendations;
a computer data repository configured to record, for particular recommendation rules of the recommendation rules, the explicit feedback provided by users on item recommendations generated with the respective recommendation rules; and
a rule assessor configured to (1) use at least the explicit feedback recorded for the particular recommendation rules to assess quality levels of the respective recommendation rules, and (2) based on said quality levels, modify the recommendation service's use of particular recommendation rules to generate personalized item recommendations.

2. The recommendation system of claim 1, wherein the recommendation rule mining component is capable of generating a recommendation rule that includes an item-to-item mapping, and the rule assessor is capable of using the explicit feedback to assess whether the item-to-item mapping is useful for generating personalized item recommendations.

3. The recommendation system of claim 1, wherein the recommendation interface enables users to provide said explicit feedback by explicitly rating specific recommended items.

4. The recommendation system of claim 1, wherein the recommendation interface enables users to provide said explicit feedback by indicating whether particular item recommendations are useful.

5. The recommendation system of claim 1, wherein the rule assessor additionally uses implicit feedback from users on particular item recommendations to assess the recommendation rules.

6. The recommendation system of claim 1, wherein the rule assessor uses the feedback received on recommendations generated using a particular recommendation rule to generate a data value reflective of a quality of the rule.

7. The recommendation system of claim 6, wherein the rule assessor generates the data value such that different non-zero amounts of weight are given to different feedback votes.

8. The recommendation system of claim 1, wherein the items are catalog items represented in an electronic catalog of items, and the event history data is reflective of user-generated events performed by users during browsing of the electronic catalog.

9. A computer-implemented method, comprising:
generating a recommendation rule based at least in part on aggregated event history data of a plurality of users, said recommendation rule specifying an item to recommend to users, and at least partly specifying a condition to be checked by a recommendation service to determine whether the rule is applicable to particular users;
via said recommendation service, using the recommendation rule to provide personalized recommendations of the item to each of plurality of users that satisfy the condition, and providing the users an option, via a recommendations interface, to provide feedback on said personalized recommendations of the item;
receiving feedback from at least some of said users on the personalized recommendations of the item, and recording the received feedback for the recommendation rule; and
using the recorded feedback to modify the recommendation service's use of the recommendation rule to generate additional personalized recommendations of the item;
said method performed in its entirety by a computer system that comprises one or more computer processors.

10. The method of claim 9, wherein said option to provide feedback is provided on personalized recommendations pages that display the personalized recommendations.

11. The method of claim 9, wherein said option to provide feedback comprises an option to explicitly indicate whether the recommendation is helpful.

12. The method of claim 9, wherein the method comprises using both explicit feedback and implicit feedback on the personalized recommendations of the item to assess the recommendation rule.

13. The method of claim 9, wherein the method comprises determining whether a threshold quantity of feedback has been received for the recommendation rule, and when said threshold quantity of feedback has not been received, causing a recommendation of said item to be increased in display rank to increase a likelihood of obtaining additional feedback on the recommendation rule.

14. The method of claim 9, wherein using the recorded feedback to modify the recommendation service's use of the recommendation rule comprises adjusting a weight value that specifies how much weight is given to the recommendation rule.

15. The method of claim 9, wherein using the recorded feedback to modify the recommendation service's use of the recommendation rule comprises inhibiting a candidate recommendation that is based on the recommendation rule from being presented to a user.

16. The method of claim 9 wherein using the recorded feedback to modify the recommendation service's use of the recommendation rule comprises adjusting a display rank of a personalized item recommendation that is based on the recommendation rule.

17. The method of claim 9, wherein the recommendation rule comprises an item-to-item mapping.

18. The method of claim 9, wherein the recommendation rule comprises a mapping of a search query to said item.

19. The method of claim 9, wherein the recommendation rule comprises a mapping of an email address domain to said item.

20. The method of claim 9, wherein the recommendation rule comprises a mapping of a geographic region to said item.

21. A recommendation system, comprising:
a computer system comprising one or more computers, said computer system configured to implement at least:
a data repository of user-specific item preference data that reflects item preferences of particular users;
a data repository of recommendation rules, the recommendation rules based at least in part on aggregated event history data of a plurality of users, and reflecting behavior-based associations detected from the aggregated event history data;
a recommendation service configured to apply the recommendation rules to the user-specific item preference data of particular users to identify items to recommend to such users;
a computer data repository configured to record, for particular recommendation rules of the recommendation rules, feedback provided by users on item recommendations generated by the recommendation service using the respective recommendation rules; and
a rule assessor configured to use the feedback recorded for a recommendation rule to modify the recommendation service's use of the recommendation rule to generate recommendations.

22. The recommendation system of claim 21, wherein the recommendation rules include behavior-based item-to-item mappings derived by analyzing actions of a plurality of users.

23. The recommendation system of claim 21, wherein at least some of the recommendation rules are based on content-based item similarities detected by analyzing item content.

24. The recommendation system of claim 21, wherein the feedback includes or consists of implicit feedback.

25. The recommendation system of claim 21, wherein the rule assessor generates, for each of a plurality of recommendation rules, rule-specific statistics that are based solely on feedback provided by users on item recommendations generated with the respective recommendation rule.

26. The recommendation system of claim 21, wherein the recommendation service comprises a feedback-based adjuster configured to modify a set of personalized item recommendations generated by a recommendation engine based on the recorded feedback corresponding to the particular recommendation rules used to generate the set of personalized item recommendations.

27. The recommendation system of claim 26, wherein the feedback-based adjuster modifies the set of personalized item recommendations at least partly by modifying relative rankings of individual items within the set of personalized item recommendations.

28. The recommendation system of claim 21, wherein the recommendation service comprises a recommendation interface that enables a user to provide explicit feedback on specific item recommendations from a personalized recommendations page that displays a plurality of item recommendations.

29. The recommendation system of claim 1, wherein the recommendation interface is capable of generating a personalized recommendations page that lists a plurality of recommended items, and for each such recommended item, provides (1) an indication of a basis for recommending the item, and (2) a display element for rating the item.

30. The recommendation system of claim 1, wherein the rule assessor generates, for a recommendation rule, rule-specific statistics on the explicit feedback provided by users on recommendations generated with the recommendation rule.

31. The recommendation system of claim 1, wherein the computer data repository comprises a statistics table that stores rule-specific statistics for particular recommendation rules, wherein the rule-specific statistics for each recommendation rule are based solely on user feedback provided on item recommendations generated with the respective recommendation rule.

32. The recommendation system of claim 1, wherein the recommendation service comprises a feedback-based adjuster that is configured to receive a personalized set of item recommendations generated by a recommendation engine, and to modify the personalized set of item recommendations based on a combination of said assessments of the particular recommendation rules used by the recommendation engine to generate the personalized set of item recommendations.

33. The recommendation system of claim 32, wherein the feedback-based adjuster is configured to modify relative rankings of particular items within the personalized set of item recommendations.

34. The method of claim 9, wherein recording the feedback in association with the recommendation rule comprises generating a record in which each of a plurality of feedback events is identifiable as resulting from an item recommendation generated with the recommendation rule.

35. The method of claim 9, wherein recording the received feedback for the recommendation rule comprises programmatically determining that a user rating of the item is associated with use of the recommendation rule to recommend the item.

36. The method of claim 9, wherein recording the feedback in association with the recommendation rule comprises generating, for said recommendation rule, feedback statistics that are based solely on feedback provided by users on item recommendations generated with the recommendation rule.

37. The method of claim 9, wherein modifying the recommendation service's use of the recommendation rule comprises modifying, within a personalized set of item recommendations generated by a recommendation engine, a relative ranking of an item recommendation generated with said recommendation rule.

* * * * *